(12) United States Patent
Becker et al.

(10) Patent No.: US 7,400,234 B2
(45) Date of Patent: Jul. 15, 2008

(54) MULTIMEDIA UNIT HAVING MULTIPLE TRANSCEIVERS FOR USE IN A VEHICLE

(75) Inventors: Michael Becker, Philippsburg (DE); Frank Bähren, Karlsruhe (DE); Andreas Stiegler, Ettlingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1148 days.

(21) Appl. No.: 10/012,200

(22) Filed: Nov. 13, 2001

(65) Prior Publication Data

US 2002/0113690 A1 Aug. 22, 2002

(30) Foreign Application Priority Data

Nov. 10, 2000 (DE) .............................. 100 55 863

(51) Int. Cl.
*B60Q 1/00* (2006.01)
(52) U.S. Cl. ..................... 340/438; 370/245; 455/99
(58) Field of Classification Search ................. 340/438, 340/500; 455/3.1, 6.1, 99; 370/245, 456
See application file for complete search history.

(56) References Cited

U.S. PATENT DOCUMENTS

| | | | | |
|---|---|---|---|---|
| 4,942,571 A * | 7/1990 | Möller et al. | ............... | 370/85.1 |
| 5,566,171 A | 10/1996 | Levinson | ........................ | 12/56 |
| 6,167,061 A * | 12/2000 | Nakatsugawa | ............... | 370/480 |
| 6,414,941 B1 * | 7/2002 | Murakami | ................... | 370/245 |
| 6,470,012 B2 * | 10/2002 | Nakatsugawa | ............... | 370/392 |
| 6,512,777 B1 * | 1/2003 | Nakatsugawa | ............... | 370/456 |

FOREIGN PATENT DOCUMENTS

| | | |
|---|---|---|
| DE | 689 12 085 | 1/1994 |
| EP | 0 841 778 A2 | 5/1998 |
| EP | 0 841 788 A2 | 5/1998 |

* cited by examiner

*Primary Examiner*—Brent Swarthout
(74) *Attorney, Agent, or Firm*—O'Shea, Getz & Kosakowski, P.C

(57) ABSTRACT

In a ring-shaped MOST network installed in a motor vehicle, several units are linked to one another by several linkage sections. They function as data source, data sink, or transceiver. At least some of the units have two or more transceiver modules. To relieve the processors of such units with more than one transceiver module, only one network controller is present in such a unit for all its transceiver modules.

14 Claims, 1 Drawing Sheet

MULTIMEDIA UNIT HAVING MULTIPLE TRANSCEIVERS FOR USE IN A VEHICLE

BACKGROUND OF THE INVENTION

The present invention relates to a vehicle multimedia system, and in particular to a vehicle multimedia system that includes a plurality of multimedia units that communicate over a data bus, and at least one of these multimedia units includes at least two transceiver modules that are controlled by a single network controller.

Motor vehicles such as for example cars, trucks, and buses may include a multimedia system that is configured as a ring-shaped data network. This network structure links several multimedia units to one another, which function as data source, data sink, or transceiver, as needed for the multimedia system.

A ring-shaped data network in a motor vehicle can link multimedia units such as for example a radio receiver, a television set, monitors, a CD player, a DVD player, a CD or DVD changer, a cassette recorder, active loudspeakers, a navigation system, a car telephone, a wireless telephone, as well as operating and control units. Two or more transceivers can be connected in series in the units enumerated above, although the unit outwardly has only one input and one output. However, from the point of view of the network, the transceivers in one unit are regarded as independent network subscribers. This makes it necessary to accommodate within this unit a network controller for all the transceivers present in this unit. However, this puts a heavy load on the processor of the unit.

Therefore, there is a need for an improved technique for connecting multimedia units of a vehicle multimedia system.

SUMMARY OF THE INVENTION

Briefly, according to an aspect of the present invention, a multimedia system for use in a motor vehicle includes a plurality of multimedia units that are connected in a ring-shaped data bus. At least one of the multimedia units includes at least two transceivers that are controlled by a single network controller.

Significantly, providing a single network controller for a multimedia unit having a plurality of transceivers relieves the processors of these units. From the point of view of the network, the transceivers of the multimedia unit no longer look like independent network subscribers. Rather, the network sees a non-intelligent node, which is controlled by an intelligent node.

The invention is especially suited for a ring-shaped MOST network.

These and other objects, features and advantages of the present invention will become more apparent in light of the following detailed description of preferred embodiments thereof, as illustrated in the accompanying drawings.

DETAILED DESCRIPTION OF THE INVENTION

A multimedia system 10 includes a plurality of multimedia units 12-21 that communicate over a ring-shaped network 24, such as a MOST network, via linkage sections 26-35. At least one of the multimedia units includes a plurality of transceiver modules. For example, in this embodiment multimedia units 12, 16-21 contain for example two transceiver modules TC, while units 13-15 include only one transceiver module TC. The linkage sections 26-35 that link the individual multimedia units 12-21 can be for example either cables or optical fibers.

Figure 1:
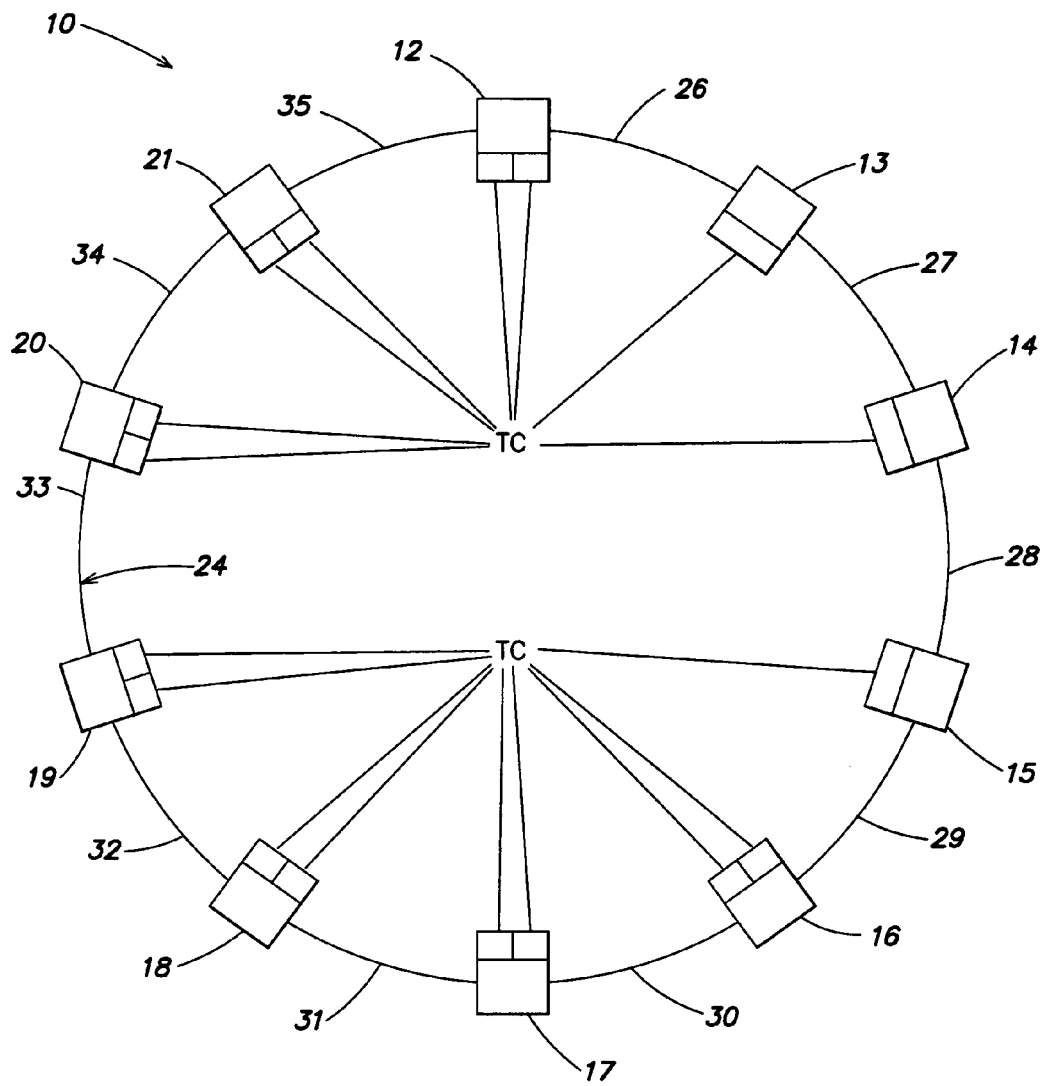
FIG. 1 is a block diagram illustration of a multimedia system that includes a plurality of multimedia units that communicate over a ring-shaped network, such as a MOST network.
Figure 2:
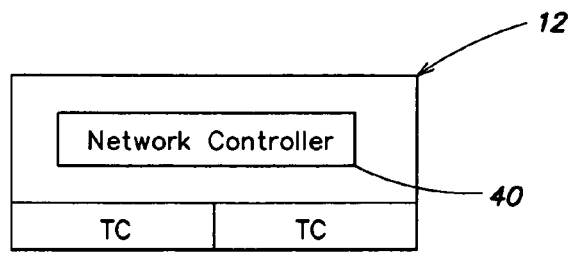
FIG. 2 is a block diagram illustration of a multimedia unit that includes at least two transceivers and a single network controller.

Referring to FIG. 2, at least one of the multimedia units (e.g., 12) that includes a plurality of transceiver modules also includes a single network controller 40 that controls the transceiver modules TC.

Although the present invention has been shown and described with respect to several preferred embodiments thereof, various changes, omissions and additions to the form and detail thereof, may be made therein, without departing from the spirit and scope of the invention.

What is claimed is:

1. A multimedia unit for use in a vehicle multimedia system that includes a plurality of multimedia units connected to a ring-shaped bus, said multimedia unit comprising a plurality of transceiver units configured to communicate over the ring-shaped bus, wherein said multimedia unit includes a network controller that controls the communication of said plurality of transceiver units over the ring-shaped bus.

2. The multimedia unit of claim 1, wherein said plurality of transceivers are configured and arranged to communicate over a ring-shaped Media Oriented Systems Transport bus.

3. The multimedia unit of claim 2, wherein the multimedia unit is configured as a radio receiver.

4. The multimedia unit of claim 2, wherein the multimedia unit is configured as a television set.

5. The multimedia unit of claim 2, wherein the multimedia unit is configured as a CD player.

6. The multimedia unit of claim 2, wherein the multimedia unit is configured as a DVD player.

7. The multimedia unit of claim 2, wherein the multimedia unit is configured as a disk changer.

8. The multimedia unit of claim 2, wherein the multimedia unit is configured as a cassette recorder.

9. The multimedia unit of claim 2, wherein the multimedia unit is configured as a navigation system.

10. The multimedia unit of claim 2, wherein the multimedia unit is configured as a multimedia network operating and control unit.

11. A motor vehicle multimedia system, comprising:
   a ring-shaped data bus; and
   a plurality of multimedia units connected to said ring-shaped bus, at least one of said multimedia units comprises a plurality of transceiver units and a network controller, wherein said multimedia units are configured and arranged to communicate over said ring-shaped bus and said network controller controls the communication of its associated said plurality of transceiver units over said ring-shaped bus.

12. The motor vehicle multimedia system of claim 11, wherein said ring-shaped data bus is configured and arranged as a Media Oriented Systems Transport bus.

13. A motor vehicle multimedia system, comprising:
   a data bus; and
   a plurality of multimedia units each connected to said data bus, and at least one of said multimedia units comprises a plurality of transceiver units and a network controller, wherein said multimedia units are configured and arranged to communicate over said bus and said network controller controls the communication of its associated said plurality of transceiver units over said data bus.

14. The motor vehicle multimedia system of claim 13, wherein said data bus is configured and arranged as a Media Oriented Systems Transport bus.

* * * * *